Figure 1:
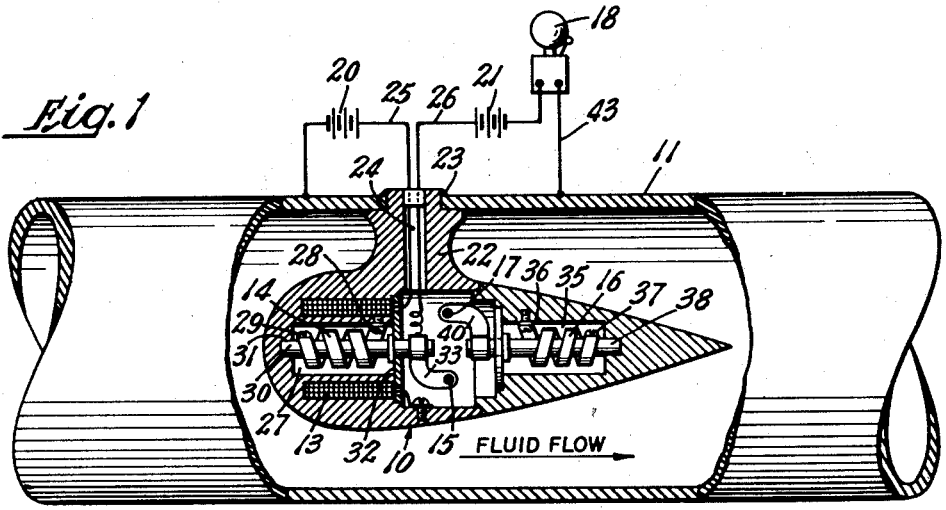

Feb. 27, 1951     D. O. NELSON     2,543,588

THERMAL FLUID FLOW INDICATOR

Filed Oct. 7, 1946

*INVENTOR.*
DONALD O. NELSON

BY

*ATTORNEY*

Patented Feb. 27, 1951

2,543,588

UNITED STATES PATENT OFFICE 2,543,588

THERMAL FLUID FLOW INDICATOR

Donald O. Nelson, West Los Angeles, Calif., assignor to Bendix Aviation Corporation, South Bend, Ind., a corporation of Delaware Application October 7, 1946, Serial No. 701,854

5 Claims. (Cl. 177—311)

This invention relates to devices for indicating whether or not fluid is flowing and has as a broad object to provide a reliable, and compact, device for this purpose.

Another object is to provide a flow indicator with substantial and known lag of response so that it will produce an indication only a predetermined interval after flow has begun or stopped.

Another object is to provide a flow indicator that is responsive to the flow integrated over an interval of time, so as to produce an indication either in response to a small change in flow continuing for a substantial interval or a larger change in flow continuing for a shorter interval.

Another object is to provide a flow indicator in which the only object exposed to the fluid flow is a small streamlined, sealed body.

Another object is to provide a flow indicator adapted to produce an indication at a point remote from the point of measurement.

Other more specific objects and features of the invention will become apparent from the description to follow.

The invention in its simplest form comprises a body immersed in the fluid, the state of flow of which is to be indicated, with a source of heat and two temperature responsive elements within the body, one element being closer to the heat source than the other, in combination with means differentially responsive to the two elements.

The operation of the invention is based upon the fact that when there is little or no fluid flow past the body there is relatively little heat conducted away from the body by the fluid. Therefore the heat generated by the heat source spreads throughout the body by rotation and conduction so that the temperature responsive element that is remote from the heat source is heated to a substantial temperature not much lower than the temperature responsive element that is closer to the heat source. On the other hand, when fluid flow occurs past the body, heat is removed from the body into the fluid by convection at a relatively rapid rate, thereby producing a much lower temperature in portions of the body remote from the heat source than closely adjacent thereto. This temperature difference is effective upon the two temperature responsive elements to produce a differential force that is employed to actuate an indicating device.

The differentially responsive means may be of various types. In one form of the apparatus the two temperature responsive elements can consist of thermostatic devices having electrical contacts thereon, and so arranged that when the two elements are at different temperatures the contacts are closed but when the two elements are at substantially the same temperature the contacts are open, or vice versa. Another device that can be employed is a thermocouple arranged with one set of junctions closer to the heat source than the other set. During fluid flow the set of junctions adjacent the heat source will be substantially warmer than the junctions more remote from the heat source, causing the production of a thermal E. M. F. of much greater magnitude than when there is no fluid flow and both sets of junctions are at very nearly the same temperature.

Figure 2:
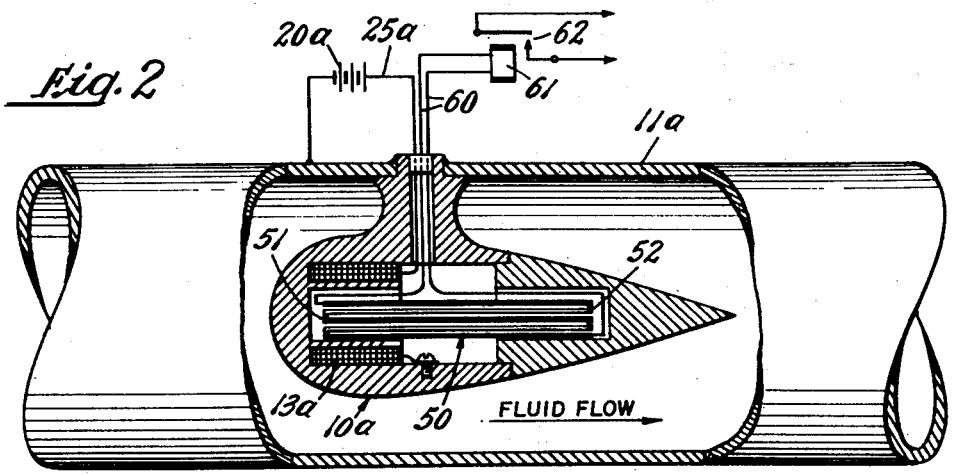

A full understanding of the invention may be had from the following detailed description taken in connection with the drawing, in which:

Fig. 1 is a longitudinal sectional view through one embodiment of the apparatus in accordance with the invention; and Fig. 2 is a similar view showing another embodiment.

Referring first to Fig. 1, there is disclosed a fluid flow pipe 11 within which the state of fluid motion is to be indicated. The apparatus in accordance with the present invention includes a body 10 which is contained within the pipe 11, a battery 20, a battery 21, an alarm bell 18 and conducting wires extending into the body 10.

In the particular construction shown in Fig. 1, the body 10 is of teardrop-shape having formed integrally therewith, a bracket 22 which extends through the wall of the pipe 11 and is welded thereto as indicated at 23 to form a fluid tight joint. This bracket 22 defines a passage 24 extending from the exterior of the pipe 11 into the interior of the body 10 for the passage of electrical conductors 25 and 26 respectively.

There is positioned within a chamber 27 in the forward part of the body 10 a helical bi-metallic strip 14 which is anchored at one end as by a screw 28 to the wall of the chamber 27 and is anchored at its other end as by a screw 29 to an axial shaft 30 which is journaled at one end in a bearing 31 provided in the forward end wall of the chamber 27. The other or rear end of the shaft 30 extends through and is journaled in a wall 32 which forms a closure for the chamber 27. There is mounted on the shaft 30 rearwardly of the wall 32 a contact arm 33 which carries an electrical contact 15. This contact arm 33 is insulated from the shaft 30 by any suitable means and is connected to the conductor 26.

There is positioned in a chamber 35 formed in the rear portion of the body 10 a second helical bi-metallic strip 16 which is anchored at one end by a screw 36 to the body 10 and is anchored at its other end by a screw 37 to a shaft 38, which is journaled for rotation similarly to the shaft 30. The shaft 38 is electrically connected to the body 10 and carries a contact arm 40 having a contact 17. The paths of movement of the contacts 15 and 17 coincide so that they come together in response to relative rotation of the two shafts 30 and 38 respectively. When the contacts 15 and 17 make, they complete a circuit for energization of the bell 18 by the battery 21, this circuit being traceable from the battery 21 over conductor 26, contact 15 to contact 17, thence through body 10 and the pipe 11 and a conductor 43 and the bell 18 back to the battery 21.

There is positioned within the body 10 adjacent the bi-metallic helix 14 a heating coil 13 which may as shown surround the chamber 27 in which the helix 14 is positioned. This heating element 13 is energized from the battery 20 over the conductor 25 and a return circuit including the body 10 and the pipe 11.

The arrangement can be such that during fluid flow through the pipe 11 the contacts 15 and 17 are open, but when fluid flow stops the contacts close to give an alarm. To this end the relative length of the bi-metallic helices 14 and 16 is such that when the helix 14 is substantially warmer than the helix 16 the contacts 15 and 17 are separated, but raising of the temperature of the helix 16 moves the contact 17 against the contact 15. During fluid flow the body 10 loses heat rapidly by convection to the fluid moving therepast so that the rear portion of the body 10 remote from the heating element 13 is strongly cooled. On the other hand the temperature of the helix 14 is only slightly affected by the rate of cooling of the body 10 because of its close proximity to the heat element 13.

It will be obvious that if it is desired to produce an alarm in response to fluid flow instead of in response to cessation of fluid flow, this result can be obtained by suitable initial adjustment of the relative positions of the contacts 15 and 17, so that they are separated when the helices 14 and 16 are both at substantially the same temperature but are moved together in response to a decrease in the temperature of the helix 16 below that of the helix 14.

In the modified form of the invention shown in Fig. 2, a thermocouple 50 is substituted for the helices 14 and 16 and their associated elements including the contacts 15 and 17. The thermocouple has its hot junctions 51 positioned within the heating element 13a and its cold junctions 52 positioned within the rear end of the body 10a relatively remote from the heating element 13a. As in Fig. 1, the heating element 13a is energized over a conductor 25a from a battery 20a and the thermocouple 50 is connected by leads 60 to a relay 61 having contacts 62.

The operation of the arrangement of Fig. 2 is readily apparent. When the heating element 13a is energized and there is fluid flow through the pipe 11a, the hot junctions 51 of the thermocouple are at a substantially higher temperature than the cold junctions 52, thereby generating an E. M. F., which causes current to flow, actuating relay 61 to close its contacts 62. The contacts 62 can be connected in any suitable alarm circuit not shown.

On the other hand, when fluid flow through the pipe 11a ceases, the entire body 10a warms up, thereby elevating the temperature of the cold junctions 52 to a temperature near that of the hot junctions 51, causing a decrease in the thermal current and the release of the relay 61.

Obviously, if desired, the relay 61 can be adapted to close its contacts when released instead of when energized.

Although for the purpose of explaining the invention several specific embodiments thereof have been described in detail, many departures from the exact constructions shown can be made without departing from the invention which is to be limited only to the extent set forth in the appended claims.

I claim:

1. Apparatus of the type described comprising: a closed body member adapted to be supported in a fluid stream to be tested; a source of heat localized within a portion only of said body member; a pair of temperature-responsive elements in said body member, one of said elements being positioned in substantially better heat-transmission relation with respect to said source than the other element, and said other element being positioned in at least as good heat-transmission relation with respect to said body member as said one element, whereby said other element varies in temperature to substantially greater extent than said one element in response to variations in temperature of said body member; and means responsive to a predetermined temperature relation between said elements.

2. Apparatus of the type described comprising: a body member adapted to be supported in a fluid stream to be tested; a source of heat localized within a portion only of said body member; a pair of temperature-responsive elements in said body member asymmetrically disposed in asymmetric heat transmission relation to said heat source; and means responsive to a predetermined temperature relation between said elements, said body member consisting of a fluid-tight casing containing said source of heat and said temperature-responsive elements whereby transfer of heat from said source to said stream takes place solely through said casing.

3. Apparatus according to claim 11 in which said source of heat and one of said temperature-responsive elements are positioned adjacent the upstream end of said body member relative to said other temperature-responsive element.

4. Apparatus of the type described comprising: a body member adapted to be supported in a fluid stream to be tested; a source of heat localized within a portion only of said body member; a pair of temperature-responsive elements in said body member, one of which elements is substantially closer to said source of heat than is the other said temperature-responsive element; and means responsive to a predetermined temperature relation between said elements.

5. Apparatus of the type described comprising: a body member adapted to be supported in a fluid stream to be tested; a source of heat localized within a portion only of said body member; a pair of temperature-responsive elements in said body member asymmetrically disposed in asymmetric heat transmission relation to said heat source; and means responsive to a predetermined temperature relation between said elements; said temperature-responsive elements including a pair of coaxial axially-spaced helical bimetallic elements having their remote ends anchored against relative movement, and having on their adjacent ends cooperating contacts movable in a common circular path concentric with respect to the axis of said helices.

DONALD O. NELSON.

REFERENCES CITED

The following references are of record in the file of this patent:

UNITED STATES PATENTS

| Number | Name | Date |
|---|---|---|
| 2,165,569 | Obermaier | July 11, 1939 |
| 2,431,241 | Godsey, Jr. | Nov. 18, 1947 |